Aug. 17, 1943.   H. J. DE N. McCOLLUM   2,327,202
AIRCRAFT HEATING APPARATUS
Filed Nov. 19, 1941
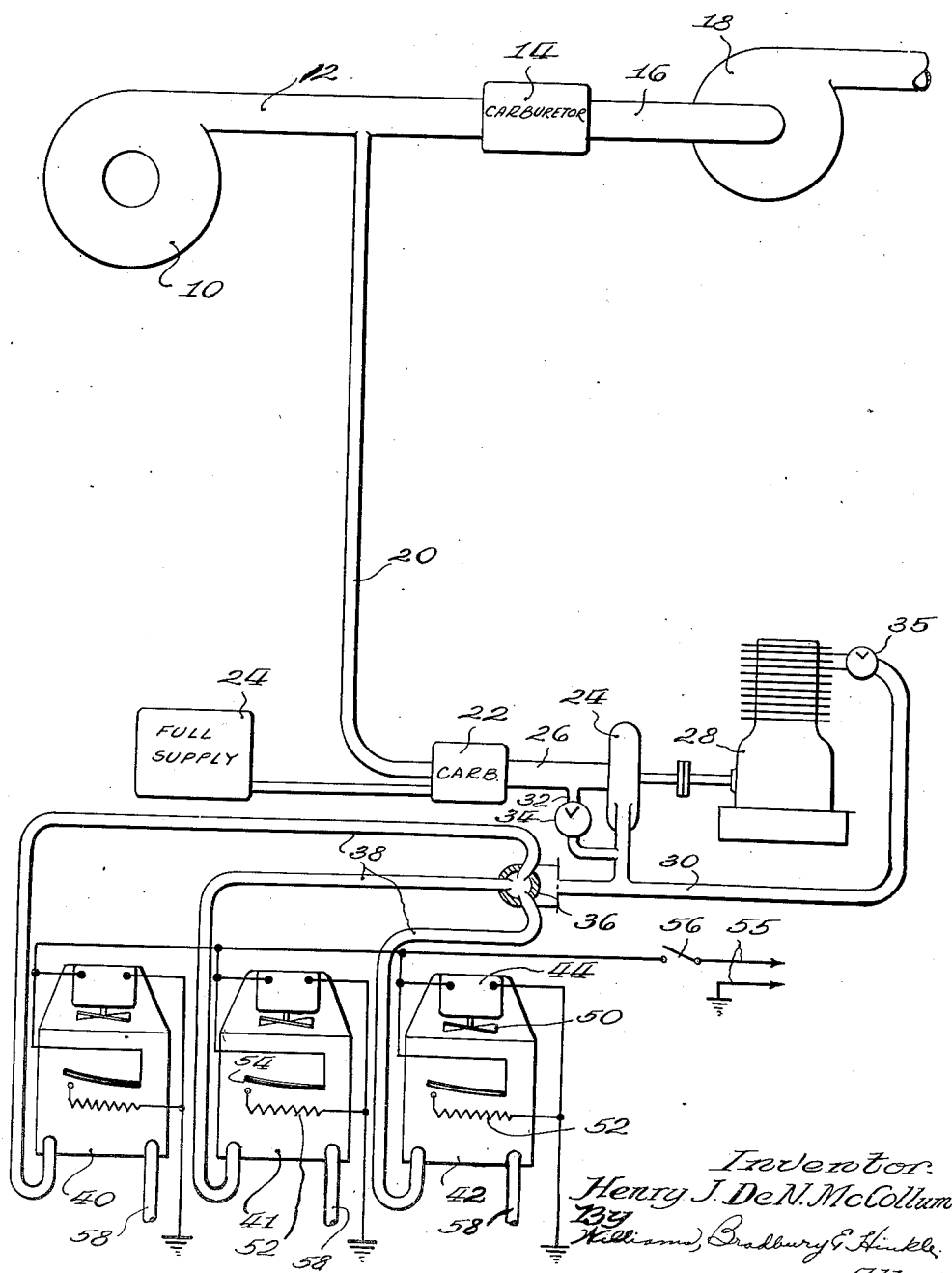
Inventor:
Henry J. DeN. McCollum
By
Williams, Bradbury & Hinkle
Attys.

Patented Aug. 17, 1943

2,327,202

UNITED STATES PATENT OFFICE 2,327,202

AIRCRAFT HEATING APPARATUS

Henry J. De N. McCollum, Chicago, Ill.

Application November 19, 1941, Serial No. 419,730

5 Claims. (Cl. 237—12.3)

My invention relates generally to aircraft heating apparatus, and more particularly to improved apparatus for supplying internal combustion type heaters with a combustible mixture adequate to support combustion under a wide range of airplane operating conditions.

In internal combustion type heaters for aircraft, some difficulty has been experienced in maintaining an adequately dense fuel mixture which will sustain combustion in the heating units under all conditions of operation. When the airplane in which the heating system is installed flies at very high altitudes, the atmosphere is so rarefied that it will not readily support combustion of the liquid fuel, such as gasoline, and, as a result, the flames in the heater units frequently become extinguished. The resulting discontinuance of the supply of heat under conditions when, as a general rule, maximum heat supply was desirable, and further, placing an unnecessary load upon the electrical generating system of the aircraft in order to reenergize the electrical ignition means to cause reignition in the heater units, is highly disadvantageous.

I have accordingly provided improved means for maintaining the fuel mixture supplied to the heater units under sufficient pressure to assure the maintenance of combustion even though the plane is flying in the extremely rarefied atmosphere of high altitudes.

It is thus an object of my invention to provide an improved heating system for aircraft in which means are incorporated to supercharge the heater units.

A further object is to provide an improved heating system for aircraft equipped with engine-driven and exhaust-gas-driven superchargers and in which the fuel mixture for the internal combustion type heater units is maintained under pressure by the engine-driven supercharger.

Other objects will appear from the following description, reference being had to the accompanying drawing, which diagrammatically illustrates the essential parts of the heating system.

The aircraft upon which the heating system is installed includes an exhaust turbo-driven supercharger 10 which is capable of raising the pressure of the air considerably above that of the atmosphere surrounding the aircraft. The air under pressure is discharged from the supercharger 10 through a conduit 12 leading to a carburetor 14, which is preferably of the balanced float bowl type, the combustible mixture from the carburetor 14 being supplied through a conduit 16 to the inlet of an engine-driven supercharger 18, the latter supplying the combustible mixture to the airplane engine under considerably increased pressure.

In order to supply air under pressure for the operation of the heating system, the conduit 12 has a branch 20 leading to a carbureting device 22, which is preferably of the balanced float bowl type and which is supplied with liquid fuel, such as gasoline, from a suitable tank 24. The combustible mixture supplied by the carburetor 22 is conveyed to the inlet of a blower 24 through a conduit 26. The blower 24 is preferably of the positive displacement type and is driven by an internal combustion engine 28, receiving a supply of combustible mixture for its operation through a conduit 30 connected to the outlet of the blower 24. A bypass conduit 32 is provided between the inlet and outlet of the blower 24, and flow therethrough is regulated by a manually operable valve 34, such regulation being desirable to control the pressure in the conduit 30, and thus to control the speed of operation of the engine 28 and the rate of fuel combustion in the heater units. A suitable throttle valve means 35 may be utilized expressly for the control of the speed of operation of the engine 28, especially if the blower 24 is not of the positive displacement type.

The conduit 30 has a branch leading to a header 36, to which are connected a plurality of conduits 38 leading, respectively, to heater units 40, 41, and 42. Each of the heater units may be of the construction disclosed in my co-pending application Serial No. 377,181, filed February 3, 1941, and generally will include a motor 44 operating a fan 50 for circulating air past the heat exchanger of the unit and also will include an electrical resistance wire igniter 52 controlled by a thermostatically operated switch 54, which is closed when cold and opens when heated as the unit approaches its normal operating temperature. Although illustrated as simple thermostatic bimetal switches, the switches 54 are preferably snap switches of the "micro-switch" type operated by a bimetal member. The fan motors 44 and igniters 52 are supplied with current through main conductors 55 connected to a suitable source of current under the control of a manually operable switch 56. The electrical control circuit is shown in a simple form, but in practice will have various additional elements to assure proper and safe operation of the system.

The heater units 40, 41, and 42, are provided with discharge conduits 58 which may exhaust to the atmosphere, preferably at a point along the outer wall of the fuselage, at which a partial vacuum is present while the aircraft is in flight.

Assuming the aircraft engine is in operation, to condition the heating system for operation, the internal combustion engine 28 is started, and the valve 34 adjusted to maintain the engine operating at the desired speed, whereupon, the switch 56 may be closed to energize the igniters 42 and fan motors 44. The supply of air derived from the conduit 12 is at a pressure above that of the surrounding atmosphere, and after being mixed with fuel in the carburetor 22, is further compressed by the blower 24 and supplied both to the engine 28 and to the heater units 40, 41, and 42. The mixture is ignited in these units by the electrical igniters 52 and the heat generated by such combustion is transferred to the air circulated over these heater units by their motor-driven fans 50.

The discharge conduits 58 may each, or collectively, be provided with a suitable restriction if, due to their length, they do not of themselves offer sufficient resistance to the flow of the products of combustion to maintain some back pressure in the heater units. It is important that the combustible mixture entering the heater units be at a sufficient pressure to assure the maintenance of combustion even when the plane is flying at extremely high altitudes. This is accomplished because of the utilization of the compressed air supplied by the turbo supercharger 10 and additionally by the blower 24 which further compresses the combustible mixture.

The three units 40, 41, and 42 are illustrated as representative of any suitable number of units which may be supplied from a common source of fuel mixture. The electrical controls for these units are intended to be merely representative of any suitable control circuits which may be employed, such, for example, as shown in my Patent No. 2,281,107.

Since the amount of air required for the operation of the heating system is small compared with that required for the operation of the airplane engine, the air escaping from the conduit 12 through the conduit 20 to the heating system is insufficient materially to affect the supply for the airplane engine. The heating system employs a carbureting system separate from that of the engine, and there is, therefore, no possibility that the airplane engine operating characteristics will be adversely affected by the operation of the heating system.

While I have shown and described a preferred embodiment of my invention, it will be apparent to those skilled in the art that numerous variations and modifications may be made therein without departing from the underlying principles of my invention. I therefore desire, by the following claims, to include within the scope of my invention all such variations and modifications by which substantially the results of my invention may be obtained by the use of substantially the same or equivalent means.

I claim:

1. In a heating system for an airplane having an internal combustion engine, an exhaust gas turbine driven supercharger, and an engine driven supercharger, with the superchargers operating in series to supercharge the engine, the combination of an internal combustion type heater, a carburetor for said heater, a conduit for conveying air under pressure to said carburetor from the one of said superchargers which is first in the series, and a blower for forcing a combustible mixture from said carburetor to said heater.

2. In a heating system for an airplane having an internal combustion engine provided with two superchargers operating in series to supercharge the engine, the combination of an internal combustion type heater, a carburetor for said heater, a conduit for conveying air under pressure from the first of said superchargers to said carburetor, a blower for forcing a combustible mixture from said carburetor to said heating unit, an interal combustion engine driving said blower, and a conduit for conveying combustible mixture from said blower to said blower driving internal combustion engine.

3. The combination set forth in claim 2 in which said blower is provided with a valve-controlled bypass and said conduit for conveying combustible mixture to said blower driving internal combustion engine is provided with a flow-controlling throttle valve.

4. In a heating system for an airplane having an internal combustion engine provided with two superchargers operating in series to supercharge the engine, the combination of a plurality of internal combustion type heater units, a carburetor for said heater units, a conduit for conveying air under pressure from the first in series of said superchargers to said carburetor, a blower for forcing a combustible mixture from said carburetor to said heater units, and means for controlling the rate of supply of the combustible mixture to said heating units.

5. In a heating system for an airplane having an internal combustion engine, an exhaust gas driven turbo supercharger and an engine driven supercharger with the superchargers operating in series, an internal combustion type heater, a carburetor for said heater, said carburetor having a balanced pressure float bowl, a conduit for conveying air under pressure from said turbo supercharger to said carburetor, a positive displacement blower for forcing a combustible mixture from said carburetor to said heating unit, a conduit bypassing said blower, a valve in said bypass conduit, an internal combustion engine connected to drive said blower, and means to convey to said blower driving engine a portion of the combustible mixture supplied by said blower.

HENRY J. DE N. McCOLLUM.